United States Patent [19]

Kaleda et al.

[11] Patent Number: 4,767,634

[45] Date of Patent: * Aug. 30, 1988

[54] COFFEE DECAFFEINATION WITH CAFFEIC ACID

[75] Inventors: William W. Kaleda, Westwood, N.J.; Fouad Z. Saleeb, Pleasantville; Bary L. Zeller, Mahopac, both of N.Y.

[73] Assignee: General Foods Corporation, White Plains, N.Y.

[*] Notice: The portion of the term of this patent subsequent to Jun. 4, 2002 has been disclaimed.

[21] Appl. No.: 870,197

[22] Filed: Jun. 3, 1986

[51] Int. Cl.4 .............................................. A23F 5/22
[52] U.S. Cl. .................................. 426/271; 426/422; 426/427; 544/274
[58] Field of Search ...................... 426/271, 422, 427; 544/274

[56] References Cited

U.S. PATENT DOCUMENTS 4,521,438 6/1985 Zeller et al. ................... 426/422 X
4,547,378 10/1985 Saleeb et al. .................. 426/422 X

*Primary Examiner*—Joseph Golian
*Attorney, Agent, or Firm*—Thomas A. Marcoux; Joseph T. Harcarik; Daniel J. Donovan

[57] ABSTRACT

A method of decaffeination wherein a caffeine-containing coffee extract solution is contacted with caffeic acid in the presence of water. The caffeine and the caffeic acid form an insoluble caffeine/caffeic acid complex wherein the complex is separated from the coffee extract solution.

21 Claims, No Drawings

COFFEE DECAFFEINATION WITH CAFFEIC ACID

BACKGROUND OF THE INVENTION

1. Technical Field

This invention relates to a method of decaffeination which comprises contacting a caffeine-containing extract solution with caffeic acid in the presence of water wherein the caffeine and caffeic acid form an insoluble complex and then separating the caffeine/caffeic acid complex from the caffeine extract solution. The caffeine containing extract solution includes any solvent solution, aqueous or nonaqueous, which directly contacts green or roasted coffee for purposes of decaffeination and any subsequent solvent solution, aqueous or nonaqueous, which contacts solvent solutions that have been employed for decaffeination.

2. Background Art

Numerous decaffeination techniques abound in the art. One widely used method is the so-called water decaffeination technique disclosed in U.S. Pat. No. 2,309,092 to Berry et al. In the water decaffeination method, hydrated green coffee beans are extracted with a caffeine-deficient green coffee extract in a multi-stage countercurrent extraction battery. As the green coffee extract progresses through the battery, it becomes increasingly rich in caffeine while contacting decreasingly decaffeinated coffee beans. The caffeine-laden coffee extract withdrawn from the last stage of the battery is treated to remove the caffeine therefrom and subsequently returned to the system. The caffeine is removed from the green coffee extract by contact with an organic solvent, typically a halogenated organic solvent, such as methylene chloride. While the water decaffeination technique enjoys wide application, it is becoming increasingly desirable to avoid the use of organic solvents in food processing.

Additional decaffeination techniques exist, but not without drawbacks. For example, the use of a sugar-loaded activated carbon adsorbent is disclosed in European Patent No. 0,008,398 granted May 19, 1982. While the use of an organic solvent is avoided, the activated carbon adsorbent tends to adsorb non-caffeine coffee solubles as well as the caffeine, severely impairing the economy of the method.

A complexation approach, only with respect to the decaffeination of an aqueous tea extract, is disclosed in U.S. Pat. No. 4,315,036 to Husiani et al. An aqueous tea extract is cooled to precipitate out the cold-water-insoluble complex of caffeine and tannins that are already present in the tea. The method has the advantage of using a complexing compound that is already present in tea and does not then have to be added. Although the tannin/caffeine complex may well be insoluble and therefore precipitate out, such tannins are not present in aqueous coffee extracts.

Many compounds, some native to coffee, are known to complex with caffeine. For example, I. Horman and R. Viani, in "The Nature and Conformation of the Caffeine-Chlorogenate Complex of Coffee" J. Food Sci. 37 (1972) 925-27, recognize ten such caffeine complexes, including the well-studied, water soluble chlorogenic acid/caffeine complex. While it had earlier been speculated that the complexing compounds might be useful in a decaffeination method if it formed a water-insoluble caffeine complex, no such compound native to coffee has heretofore been identified. Moreover, any such native complexing compound would have to compete with the chlorogenic acid and/or break the relatively strong chlorogenic acid/caffeine complex.

SUMMARY OF THE INVENTION

This invention pertains to a method of decaffeinating which comprises contacting a caffeine-containing coffee extract solution with caffeic acid in the presence of water wherein the caffeine and the caffeic acid form an insoluble caffeine/caffeic acid complex and separating the caffeine/caffeic acid complex from the coffee extract solution. The coffee containing extract solution is defined to include any solvent solution, aqueous or nonaqueous, which directly contacts green or roasted coffee for purposes of decaffeination and any subsequent solvent solution, aqueous or nonaqueous, which contacts solvent solutions that have been employed for decaffeination.

It is found when this invention is employed the coffee may be decaffeinated employing a process that has little adverse affect on the coffee.

DETAILED DESCRIPTION OF THE INVENTION

Caffeic acid is a yellow crystalline material which begins to soften at about 195° C. It is only sparingly soluble in water at less than about 25° C. but freely soluble in water at greater than about 80° C. and freely soluble in alcohol across a wide range of temperatures. The caffeic acid/caffeine complex, however, was unexpectedly found to be insoluble in aqueous solutions over a wide range of temperatures. Although caffeic acid has been reported as high as 0.5% by weight of a roasted and ground coffee, it has now been found that in actuality, caffeic acid is present in only slight amounts in green coffee and in relatively greater but still small amounts in roasted coffee, comprising only about several hundred parts per million of the roasted coffee beans or a typical soluble coffee powder. The greater amount of the acid in roasted coffee results from caffeic acid being one of the roasting breakdown products of the more abundant chlorogenic acid. The caffeic acid used in the present invention may be chemically synthesized but is most preferably obtained from roasted coffee or by the acid hydrolysis of chlorogenic acid so that the decaffeination takes place with compounds native to coffee.

Caffeic acid is particularly suitable because it forms the insoluble complex despite the presence of large amounts of chlorogenic acid in the coffee extracts and despite the caffeic acid/caffeine complex having a lower association constant than the chlorogenic acid/caffeine complex. Horman et al., in the hereinabove cited article, report an association constant of 16.9 for the chlorogenic acid/caffeine complex and an association constant of 12.2 for the caffeic acid/caffeine complex. Inasmuch as the association constant is a measure of the relative strength of the complex, it is surprising that the added caffeic acid is able to break the chlorogenic acid/caffeine complex undoubtedly already present in the coffee extract and subsequently form the insoluble, colloidal caffeic acid/caffeine complex. Such a result would not be expected based on the reported association constants.

In order to decaffeinate a caffeine-containing extract solution according to the present invention the caffeic acid is combined with the caffeine-containing extract solution in the presence of water. The caffeine-containing extract solution may be any solvent solution, aqueous or nonaqueous, which directly contacts green or roasted coffee for the purposes of decaffeination. The caffeine-containing extract solution may also be a subsequent solvent solution, aqueous or nonaqueous, which contacts an extract solution containing caffeine which has been obtained from green or roasted coffee.

An example of a coffee extraction decaffeination method describing a method wherein a caffeine-containing extract is obtained by contacting either green or roasted coffee extract to remove the caffeine from the coffee is described in U.S. Pat. No. 4,521,438 to Zeller et al. herein incorporated by reference.

The green coffee extract typically contains between 20% and 35% by weight coffee solubles and from 0.5% to 1.0% by weight caffeine. Extracts of roasted coffee generally used for the manufacture of soluble coffee may also be decaffeinated. Such roasted coffee extracts most often contain from 10% to 30% by weight coffee solubles and from 0.5% to 5% by weight caffeine. This patent describes contacting the caffeine-containing extract with caffeic acid to form an insoluble colloidal caffeic acid/caffeine complex. Crystals are grown of the insoluble complex which may be separated from the liquid. The insoluble caffeic acid/caffeine crystals are then separated from the decaffeinated liquid. The caffeic acid solution is preferably combined with a caffeine-containing coffee extract at temperatures of about 50° C. to 95° C. The mole ratio of caffeic acid to caffeine is generally not below 1:1, or above 3:1 and preferably is above 1.5:1. In order to aid in growing the crystals the method further comprises cooling the caffeic acid and coffee extract combination to temperatures from about 0° C. to about 50° C. Acids may be added to the coffee extract to lower the pH to about 4.5 which also promotes crystal growth. The crystal complexes may be separated from the coffee extract using such techniques as filtration or centrifugation.

In another embodiment of this invention the caffeine-containing extract may be moist carbon dioxide which may be in either the supercritical or liquid phase which contacts either green or roasted coffee to remove caffeine. A method for contacting supercritical carbon dioxide with green coffee is more fully described in U.S. Pat. No. 4,260,639 to Zosel herein incorporated by reference. In this patent, coffee is contacted with moist carbon dioxide at temperatures within the range of 40° to 80° C., at pressures in the range of 120 to 180 atmospheres and at contact times of 5 to 30 hours. The coffee and moist supercritical carbon dioxide are contacted in a pressure vessel. The moist supercritical carbon dioxide enters the pressure vessel, passes through the coffee and exits wherein the caffeine is removed prior to reintroducing the moist carbon dioxide back into the vessel. According to this invention the caffeine may be removed from the moist supercritical carbon dioxide by adding caffeic acid to the moist carbon dioxide solution after it has exited the coffee-contact vessel. The crystals are grown and then separated from the liquid as discussed previously. The decaffeinated moist supercritical carbon dioxide is then returned to the coffee-contact vessel.

In another embodiment of this invention green coffee beans may be decaffeinated with solutions of esters of polyhydric alcohols and edible carboxylic acids. This method is further described in U.S. Pat. No. 3,682,648 to Mitchell et al., herein incorporated by reference. The caffeine as described above may be removed from this caffeine-containing extract solution by contacting it with caffeic acid in the presence of water allowing the crystals to form and grow. The crystals are then separated from the solution. The substantially caffeine-free coffee extract may be then reintroduced to the coffee for further decaffeination.

In addition to the above described caffeine-containing extract solutions the caffeic acid may be used to decaffeinate any other caffeine-containing extract solvent, aqueous or nonaqueous, which has contacted either green or roasted coffee. If a nonaqueous solution is employed, then water must be present in order for the complex to form. The water may be present as free water if the solvent is immiscible with water or the water may be dissolved into the solvent if the solvent is miscible with water.

In another embodiment of this invention caffeine contained in an extract solvent obtained by contacting the extract solution with either green or roasted coffee may be transferred to a second or subsequent extract solution in order to remove the caffeine from the prior extract solution. The caffeine must then be removed from the subsequent caffeine-containing extract solution.

An embodiment of this invention is described in U.S. Pat. No. 4,547,378 Saleeb et al. herein incorporated by reference. According to this process, an aqueous roasted coffee extract is decaffeinated by contacting the roasted coffee extract with a halogenated hydrocarbon such as methylene chloride so that the caffeine and a lesser amount of noncaffeine solubles are transferred from the roasted coffee extract to the caffeine solvent. The substantially decaffeinated roasted coffee extract and the caffeine-containing solvent are separated. The caffeine solvent is then concentrated to at least 4% by weight. Next the concentrated solvent is contacted with an aqueous suspension of caffeic acid which suspension contains at least an equal molar amount of caffeic acid as caffeine in the solvent. After the caffeic acid-caffeine complex is grown in the water phase, the crystals are filtered out. The water phase is then separated from the caffeine solvent. The caffeine solvent which still contains noncaffeine solubles is then added to the substantially decaffeinated roasted coffee extract. The organic caffeine solvent is then stripped from the roasted coffee which is dried to provide a soluble coffee of improved flavor.

Another embodiment of this invention employing a subsequent caffeine-containing extract solution is similar to the previously described supercritical carbon dioxide system. The caffeic acid, however, is not contacted with the moist supercritical carbon dioxide stream as it exits the coffee-contact vessel. Rather the moist carbon dioxide is first contacted with another solvent such as water in a scrubbing tower wherein the water is used to remove the caffeine from the moist supercritical carbon dioxide. As the water exits the scrubber it is then contacted with caffeic acid wherein the caffeic acid complexes with the caffeine forming insoluble crystals which grow and are removed as described previously. The decaffeinated water is then recirculated to the scrubber. While very little of the coffee flavor precursors pass to the water phase, any coffee flavor precursors will eventually saturate the water phase which is recirculated to the scrubber thus resulting in little removal of coffee flavor precursors from the system.

In another embodiment of this invention a caffeine-containing aqueous extract may have the caffeine removed from the extract by contacting it with water immiscible fatty materials. An example of such a process is described in U.S. Pat. No. 4,465,699 to Pagliaro et al. According to this process a caffeine-containing extract is contacted with a liquid water immiscible fatty material which is capable of removing caffeine therefrom. The fatty material includes saturated and unsaturated fats and oils such as coffee oil. The fatty material is maintained in contact with the extract for a time sufficient to transfer caffeine from the extract to the fatty material. The aqueous extract is then separated from the caffeine-laden fatty material. Next a suspension of caffeic acid in water is contacted with the fatty material. Caffeine is transferred to the aqueous phase. As the caffeine enters the water it forms an insoluble crystal complex with caffeic acid which promptly precipitates out of solution. As the caffeine is removed from the system more caffeine is transferred to the water phase to reestablish the partition equilibrium. This continues until the desired level of decaffeination of the fatty material has been reached. Thus, the water is decaffeinated as the oil is decaffeinated. The water which contains valuable coffee components can be added back to the extract stream and recontacted with new coffee oil. Eventually the water will become saturated with noncaffeine compounds which is desirable. The water is both decaffeinated and saturated with noncaffeine solids, so that it will not prevent transfer of any additional caffeine but will inhibit transfer of noncaffeine solids. The fatty material will eventually become saturated with noncaffeine compounds since it is recycled as well.

In another embodiment of this invention non-halogenated caffeine solvents other than fatty materials may be employed for decaffeinating coffee extracts, such as ethyl acetate; benzyl alcohols; hydrocarbons, such as xylene or non-aromatics such as liquid cycloalkanes; ethyl acetate; diethylether; hydrocarbons, including aromatics such as xylene or non-aromatics such as liquid low molecular weight alcohols; and acetone. These latter methods are described in U.S. Pat. No. 4,256,774 to Strobel et al. In this method coffee extracts which have been used to decaffeinate coffee may be contacted with a water-saturated solvent such as ethyl acetate to transfer the caffeine to the solvent. Dry caffeic acid is added to the solvent wherein an insoluble caffeine/caffeic acid complex is formed which may be separated from the solvent. This process does not have a water layer. The ethyl acetate, however, has water dissolved in it.

The following examples are presented to further illustrate this invention, but it is to be understood that the invention is not to be limited to the details described therein.

EXAMPLE 1

An aqueous, equimolar solution of chlorogenic acid and caffeine was prepared by combining 30.0 g water, 1.65 g chlorogenic acid and 0.9 g caffeine. The solution was heated to near boiling. An equimolar portion of caffeic acid weighing 0.85 g was added to and dissolved in the hot solution. The solution was allowed to cool to ambient temperature. Crystal growth was observed after about one hour. After 12–14 hours, the crystals were filtered from the solution using a coarse filter paper. Subsequent analysis showed that approximately 93% of the caffeine was removed, whereas no measurable amount of chlorogenic acid was removed.

The analysis for caffeine in this and the following examples was carried out by high performance liquid chromatography (HPLC), with the removal of caffeine being measured by the change in area of the peak identified as caffeine. A Resolve Column (5$\mu$ spherical $C_{18}$; 3.9 mm × 15 cm) was used at a wavelength of about 280 nm for caffeine and caffeic acid. The mobile phase consisted of 0.0033M $KH_2PO_4$, methanol and acetic acid at a ratio of 80:20:4 parts respectively. The analysis was made at ambient temperature, isocratically, with a flow rate of 1.5 ml/min and an injection volume of 5 $\mu$l. The solutions were diluted to 0.1% by weight total solids using the mobile phase prior to analysis.

EXAMPLE 2

An aqueous solution was prepared by dissolving 0.9 g of caffeic acid in 90.0 g of near boiling water. Next, 10.0 g of a dried atmospheric coffee extract containing 9.5% by weight caffeine was dissolved in the solution. A control sample was prepared by dissolving 10.0 g of the coffee in 90.0 g of water. Both coffee solutions were allowed to cool. Cyrstals were observed in the solution containing the caffeic acid after 12–14 hours. No crystals were observed in the control sample. After 1 week, further crystal growth was observed in the solution containing the caffeic acid and the supernatant solution was decanted from the crystals and the solution was allowed to stand for another week. A small portion of the solution was analyzed and found to contain about 30% less caffeine than originally. No crystals were observed in the control sample. After the second week, crystal growth was again observed in the solution containing caffeic acid. The supernatant solution was decanted from the crystals. A small portion of the solution was analyzed and found to contain about 65% less caffeine than originally. The crystals were analyzed and found to be essentially pure 1:1 molar caffeic acid/caffeine complex. No crystals were observed in the control sample which, upon analysis, was found to have all the caffeine initially present.

EXAMPLE 3

A 10% by weight coffee solution was prepared from a dried atmospheric coffee extract containing 8.7% by weight caffeine. The solution was subdivided into 4 parts which were then heated to 70° C. Caffeic acid was added to three of the samples at a ratio of 1.1:1 moles caffeic acid to caffeine. The four samples were then cooled to 40° C. Acetic acid was added to two of the caffeic acid-containing samples to lower the pH of the first to 4.5 and the pH of the second to 4.2. The 4 samples were stirred at 40° C. and periodically subsampled. The results are shown in the Table below.

TABLE

| Sample | Acetic Acid | pH | % decaffeination 24 hours | 5 days |
|---|---|---|---|---|
| 1 (control-no caffeic acid) | No | 5.1 | — | — |
| 2 | No | 4.9 | 9 | 54 |
| 3 | Yes | 4.5 | 49 | 64 |
| 4 | Yes | 4.2 | 64 | 70 |

After 5 days, the crystals were filtered from samples 2–4 using ultracentrifugation at 350,000 g's for 30 minutes. The crystals were analyzed and found to be essentially pure 1:1 molar caffeic acid/caffeine complex. No crystals were observed in the control sample, sample 1.

EXAMPLE 4

1. A roasted coffee extract, containing about 15% by weight total solids and 0.6% by weight caffeine, was obtained from a countercurrent multi-stage extraction battery having 6 stages and a feedwater temperature of about 180° C.

2. The roasted coffee extract was concentrated in a Centritherm evaporator to a concentration of about 55% by weight solids to strip the aroma and flavor therefrom.

3. The stripped roasted coffee extract was then diluted to a concentration of about 25% by weight total solids and about 1% by weight caffeine.

4. The roasted coffee extract was contacted with methylene chloride in a Karr column at ambient temperature. The weight ratio was 4.5:1 methylene chloride to roasted coffee extract. The degree of decaffeination was in excess of 97% by weight of the caffeine initially present. The methylene chloride withdrawn from the Karr column contained about 0.25% by weight total solubles. The caffeine concentration was 0.17% by weight with the remainder of the 0.25% being non-caffeine solubles.

5. The methylene chloride was concentrated in a still to 10.5% by weight total solids and 7.0% by weight caffeine.

6. A 250 cc sample of the methylene chloride was contacted in a beaker with 500 cc of an aqueous caffeic acid suspension containing 23 g of caffeic acid. Contact was at ambient temperature for about 30 minutes under moderate agitation. Crystals were seen to grow at the interface between the water and the methylene chloride.

7. The crystals were then filtered from the liquids using a coarse filter paper. The methylene chloride and water phases were allowed to separate on standing and the water was decanted off. The crystals were analyzed and found to be an equimolar complex of caffeic acid and caffeine. The methylene chloride was analyzed and it was found that about 90% by weight of the caffeine initially present had been removed.

8. The water phase recovered above was washed with two 50 cc volumes of fresh methylene chloride to recover some non-caffeine solubles. This methylene chloride washing step is a third and additional alternative for dealing with the water used in the aqueous suspension.

9. The two 50 cc volumes of methylene chloride were combined with the solvent from above and the solvent was vacuum distilled at 32° C. to 35° C. to a volume of 110 cc.

10. The concentrated 110 cc sample of methylene chloride was contacted in a beaker with 110 cc of an aqueous caffeic acid suspension containing 5 g of caffeic acid. A portion of the water from Step 8 was used to make the aqueous suspension. Contact was again at ambient temperature for about 30 minutes under moderate agitation. Crystals were again seen to grow at the interface between the water and methylene chloride.

11. The components were again separated as in Step 7. An additional 70% by weight of the caffeine present in the methylene chloride was found to have been removed. In total about 97% by weight of the caffeine initially present was removed by the two stage decaffeination.

12. The methylene chloride from Step 11 was added to the decaffeinated roasted coffee extract of Step 4. The methylene chloride was then stripped therefrom by vacuum distillation at a temperature of about 65° C. and at an absolute pressure of about 0.5 atm.

13. The water from Steps 8 and 11 was then added to the extract of Step 12 and the extract was diluted to normal cup strength, about 1% by weight total solids.

14. A control sample of roasted coffee extract which had been decaffeinated with methylene chloride under the same conditions was prepared but the methylene chloride was not then decaffeinated nor added back. The control sample was also diluted to about 1% by weight total solids.

15. The extract from Step 13 and the control samples were tasted by an expert panel. The extract of Step 13 was judged to have more body notes than the noticably thinner control sample.

EXAMPLE 5

A volume of 2 liters of ethyl acetate was contacted with 75 cc of water and allowed to equilibrate for 1 hour. About 66 cc of water dissolved and the remaining aqueous layer was removed. To the water-saturated ethyl acetate, 35 grams of caffeine was added and allowed to stand for 18 hours, after which time the undissolved caffeine was filtered out. Approximately 25 grams of caffeine dissolved to yield a solution containing 1.3% caffeine by weight.

Next, 2.52 grams of caffeic acid was added to 250 cc of the water- and caffeine-saturated ethyl acetate described above to provide 1.5 moles caffeic acid per mole of caffeine. The suspension was stirred for 3 hours during which time caffeine/caffeic acid could be seen to crystalize, indicating complexation of the added caffeic acid with caffeine. The mixture was allowed to settle for 1 hour and sampled for caffeine analysis. It was found that 67% decaffeination had been obtained.

EXAMPLE 6

A volume of 500 cc of vegetable oil was contacted with 100 cc of water and 5 grams of caffeine and stirred for 1 hour. The vegetable oil was then filtered to remove undissolved caffeine and separated from the water phase. The water saturated vegetable oil was determined by anaylysis to contain approximately 0.11% caffeine by weight. A volume of 200 cc of the oil was contacted with 25 cc of water plus 0.5 grams caffeic acid. The system was stirred for about 18 hours to establish equilibrium and was then analyzed to determine the degree of removal of caffeine from the oil. It was found that the oil was 96% decaffeinated. The solids were filtered from the sample and observed under a microscope. Approximately half of the caffeic acid had been converted to its caffeine complex evident by the altered crystalline structure.

EXAMPLE 7

Green coffee beans were decaffeinated by contacting with supercritical carbon dioxide in an extraction column. The supercritical carbon dioxide was then scrubbed with water to remove the caffeine, resulting in an aqueous solution containing 0.3 %/wt caffeine. The pH of this solution was 2.6.

In a beaker was placed 150 g of the aqueous solution. The sample contained 0.45 g of dissolved caffeine. To the solution was added 1.25 g of powdered caffeic acid to effect a molar ratio of caffeic acid to caffeine of 3:1.

The sample was heated on a stir-plate to boiling which dissolved the caffeic acid. The solution was allowed to cool to room temperature and crystals of the caffeine-caffeic acid complex precipitated along with crystals of excess caffeic acid.

The supernatant was sampled the next day and analyzed for caffeine by high-performance liquid chromatography. It was found that 92% decaffeination was obtained. A control sample was also prepared under the same conditions utilizing a 0.3% caffeine solution in pure water. The same process resulted in 93% decaffeination, indicating that the non-caffeine solids had little effect on the efficiency of decaffeination using this method.

We claim:

1. A method of decaffeination which comprises:
   (a) contacting a caffeine-containing coffee extract solution with caffeic acid in the presence of water wherein the caffeine and caffeic acid form an insoluble caffeine/caffeic acid complex;
   (b) growing crystals of the insoluble caffeic acid/caffeine complex which can be separated from the liquid; and
   (c) separating the caffeine/caffeic acid complex from the coffee extract solution.

2. A method according to claim 1 wherein the caffeine-containing extract solution is moist supercritical carbon dioxide.

3. A method according to claim 2 wherein the caffeic acid contacts the moist supercritical carbon dioxide at a temperature between about 50° C. to about 125° C.

4. A method according to claim 2 wherein the caffeine-containing extract is an extract of green coffee.

5. A method according to claim 2 wherein the caffeine-containing extract is an extract of roasted coffee.

6. A method according to claim 2 wherein the caffeic acid is combined with the caffeine-containing coffee extract solution at a mole ratio of at least 1:1 caffeic acid to caffeine.

7. A method according to claim 1 wherein the caffeine/caffeic acid complex is separated from the coffee extract solution by centrifugation.

8. A method according to claim 1 wherein the caffeine-containing extract solution is a water solution said water solution having caffeine from previous contact with a moist supercritical carbon dioxide coffee extract solution.

9. A method according to claim 8 wherein the caffeic acid is combined with the caffeine-containing water solution at a mole ratio of at least 1:1 caffeic acid to caffeine.

10. A method according to claim 8 wherein the caffeic acid contacts the water solution at a temperature between about 50° C. to about 125° C.

11. A method according to claim 1 wherein the caffeine-containing extract solution is a non-halogenated caffeine solvent having caffeine from previous contact with a caffeine-containing extract solution.

12. A method according to claim 11 wherein the previous caffeine-containing extract solution is an extract of green coffee.

13. A method according to claim 11 wherein the previous caffeine-containing extract solution is an extract of roasted coffee.

14. A method according to claim 11 wherein the non-halogenated caffeine solvent is a fatty material.

15. A method according to claim 14 wherein the fatty material is a vegetable oil.

16. A method according to claim 15 wherein the vegetable oil is coffee oil.

17. A method according to claim 11 wherein the non-halogenated caffeine solvent is selected from the group consisting of aromatic and non-aromatic alcohols, esters, ethers and hydrocarbons.

18. A method according to claim 17 wherein the non-halogenated caffeine solvent is an ester.

19. A method according to claim 18 wherein the ester is ethyl acetate.

20. A method according to claim 11 wherein the caffeic acid is combined with the non-halogenated caffeine-containing extract solution at a mole ratio of at least 1:1 caffeic acid to caffeine.

21. A method according to claim 11 wherein the caffeic acid is combined with the non-halogenated caffeine-containing extract at a temperature at or below the boiling point of the caffeine solvent.

* * * * *